United States Patent [19]
Jacobowitz et al.

[11] Patent Number: 5,337,388
[45] Date of Patent: Aug. 9, 1994

[54] MATRIX OF PLUGGABLE CONNECTORS FOR CONNECTING LARGE NUMBERS OF CLUSTERED ELECTRICAL AND/OR OPTICCAL CABLES TO A MODULE

[75] Inventors: Lawrence Jacobowitz; Mario E. Ecker, both of Poughkeepsie; Casimer M. DeCusatis, Lake Katrine, all of N.Y.

[73] Assignee: International Business Machines Corporation, Armonk, N.Y.

[21] Appl. No.: 101,118

[22] Filed: Aug. 3, 1993

[51] Int. Cl.$^5$ ................................................ G02B 6/36
[52] U.S. Cl. ............................................ 385/76; 385/89
[58] Field of Search ........................ 385/63, 55, 54, 71, 385/76, 88, 89, 138, 139

[56] References Cited

U.S. PATENT DOCUMENTS

| | | | |
|---|---|---|---|
| 4,373,778 | 2/1983 | Adham | 385/89 |
| 4,699,454 | 10/1987 | Brubaker | 385/89 |

FOREIGN PATENT DOCUMENTS

| | | | |
|---|---|---|---|
| 60-135912 | 7/1985 | Japan | 385/76 |

*Primary Examiner*—Georgia Y. Epps
*Assistant Examiner*—John Ngo
*Attorney, Agent, or Firm*—Bernard M. Goldman

[57] ABSTRACT

A matrix of cluster connectors for switching and interconnecting large numbers of optical fiber and/or electrical conductors (such as coaxial lines) to a module used in computers, communications and related applications. The matrix of pluggable cluster connector receptacles is located on a major surface of a module, such as a ceramic multi-chip module or a thin film silicon chip carrier module. A semiconductor wafer is fabricated with a matrix of angled slots fabricated to form the matrix of receptacles. The wafer is a major surface of the module, and may have another opening for chips fastened to the module surface below the wafer. Each angled slot engages an end of a plug member to align any optical fiber ends contained in the cluster held by the plug with a corresponding lens/light signal transducer in the module. Instead, a light transducer may be contained in the plug to provide electrical signals to a contact of the plug mating with a contact deposited on the wall of the engaged slot, which also engage contacts connected to coaxial lines in the cluster.

18 Claims, 18 Drawing Sheets

MATRIX OF PLUGGABLE CONNECTORS FOR CONNECTING LARGE NUMBERS OF CLUSTERED ELECTRICAL AND/OR OPTICCAL CABLES TO A MODULE

CROSS REFERENCED PATENT APPLICATIONS and PATENTS

This patent application is being filed concurrently with the following related patent application Ser. No. 08/101,119 entitled "Substrate-Embedded Pluggable Receptacles For Connecting Clustered Optical Cables To A Module", now allowed application Ser. No. 08/101,120 entitled "Pluggable Connectors For Connecting A Module To Large Numbers of Electrical and/or Optical Cables To A Module Through A Seal", application Ser. No. 08/101,121 entitled "Substrate-Embedded Pluggable Receptacles For Connecting Clustered Electrical Cable To A Module". Inventorship and assignee of each of these related applications is the same as the inventorship and assignee of the subject application.

Previously filed pertinent applications and issued patents by some of the joint inventors on the subject include: application Ser. No. 07/893,173 entitled "Apparatus and a Method for an Optical Fiber Interface" by L. Jacobowitz and M. E. Ecker, now U.S. Pat. No. 5,241,614 and, application Ser. No. 07/951,741 entitled "Apparatus and a Method for an Electrical Transmission-Line Interface" by M. E. Ecker and L. Jacobowitz, now allowed U.S. Pat. No. 5,155,786 entitled "Apparatus and a Method for an Optical Fiber Interface" by L. Jacobowitz and M. E. Ecker, and U.S. Pat. No. 5,173,668 entitled "Apparatus and a Method for an Electrical Transmission-Line Interface" by M. E. Ecker and L. Jacobowitz.

The disclosures of all of the above applications and patents are incorporated by reference herein.

INTRODUCTION

This invention relates to a matrix of array connectors for the switching of and interconnection among large numbers of optical fiber and/or electrical conductors (such as coaxial lines) encountered in computer, communication and related applications. The matrix of pluggable cluster connectors is located on a major surface of a module, such as a ceramic multi-chip module or a thin film silicon chip carrier module.

BACKGROUND OF THE INVENTION

Pluggable connectors have been used for connecting individual transmission lines and for connecting groups of discrete copper wires, twisted pairs, and a few coaxial cable and optical fibers.

The connector arts have not generally kept up with the rapid changes being made in the computer and telecommunication arts, such as in the developments for single and multi-chip modules, thermal conduction modules, silicon chip carriers, and modules on printed circuit cards or boards. The groups of electrical pins used on multi-chip modules have generally operated well at the frequencies previously required. However future direction is to use the higher frequencies and bandwidths, which cannot be handled well by the old groups of pins on a module.

This future trend is indicated by the historical trend in designing digital computer systems with ever increasing processor speeds and performance. This trend derived from complex and costly process technologies in semiconductors and electronic packaging modules. With shrinking lithographic ground rules processed on expensive cameras and etchers, increasingly dense integrated logic circuits were printed on heat-generating bipolar transistors on silicon chips soldered to costly ceramic multilayer modules using water cooling. Typically, several of these modules are connected by thousands of pins inserted into thousands of plated holes in a motherboard to comprise a computer uniprocessor. Performance extensions were achieved by coupling 8 to 12 uniprocessors into a multiprocessor complex (such as a sysplex or cecplex) with significant losses of uniprocessor efficiency and cost-to-performance ratio related to interference in all processors accessing the same main memory.

Connectors are involved in the fabrication of a spectrum of computer assemblies from workstations to supercomputers (including microprocessors loosely coupled into massively parallel systems), which can be constructed by using one or more large CMOS (Complimentary Metal Oxide Semiconductor) chips per processor on an air cooled multichip module, or by these and other types of chips on water cooled thermal conduction modules.

A fundamental problem in maximizing the efficiency of any connector construction is input/output (I/O) bandwidth, processor-to-memory and processor-to-processor, and how its signals are handled in the programmed switching of circuits.

New electronic connector packaging structures are needed to significantly increase the bandwidth and high-frequencies needed for "open systems" interconnectivity between system components of different manufacturers or across product-line families. Open systems architectures require plug compatibility and network interconnections for distributed processing.

Some of these needs may be met by this invention arranging large numbers of miniaturized I/O connectors having broad bandwidth and very high frequency capabilities on complex electronic packages which are the functional building blocks of such future systems.

Flexibility in connection is provided by this invention supporting different types of connectors in large numbers in a matrix, in which any connector may connect either or both of copper and/or optical-fiber transmission lines to a module, and which can offer designers the flexibility of providing any mix of connection types for various arrangement requirements.

In this specification, the term "module" includes several levels of packaging, as follows: A "substrate" is the inner-most part of a module; in the preferred embodiments the substrates are primarily ceramic, silicon or glass-ceramic. A "chip carrier" is a substrate having semiconductor chips placed thereon in a module, and the chip carrier is a higher level of packaging than the substrate. A "housing" is a frame around the chip carrier to seal or protect the chip carrier and is the outer-most part of a module. In the preferred embodiment described herein, the "module" encompasses a substrate, a chip carrier, and a housing, although at times the term module may be used to refer to one of these parts. A module may be referred to as either a single-chip module or multi-chip module (MCM) according to whether its contained chip carrier has single or multiple chips (i.e. a module may contain one or more chips). An example is the commercially-used thermal conduction module (TCM) constructed with alumina substrates, which is a form of MCM. An upper major surface of the TCM is covered with a thermal cooling structure, and the other major surface is covered with conductive I/O (input/output) pins which are used to plug the module into a computer framework. The substrate in a TCM is constructed with many internal layers of wiring to accommodate the interconnections among multiple chips. The TCM has a thin, low profile shape to support internal cooling in the TCM. Direct contact heat sinks are used. The low profile chip carrier in the module having small edge surfaces compared to the top and bottom surfaces of the chip carrier. The module may not have sufficient area on any surface to provide a desired number of conventional pin-in-hole type connectors, and the narrow edges of the TCM do not contain any conductive I/O pins.

Conventional pin-in-hole connectors are subject to noise which limits module performance.

SUMMARY OF THE INVENTION

This invention may be applied to a single or multi-chip module having a major surface available for supporting large numbers of easily disconnectable I/O connectors requiring ultra-high bandwidth, which must connect a large number of transmission lines to a very small area on a module. The inventive concept accommodates transmission lines made of coaxial copper, optical fiber, and mixes of both types. (For modules not having a major surface available for supporting a matrix of connectors, the inventions in the concurrent applications, cited above, may be more appropriate.)

This invention may be used with cross-point switches requiring massive amounts of switching, programmed hubs, computer coupling facilities, modular channel subsystems, reconfigurable channel directors, shared expanded storages, telecommunications backbones, cellular communications switches, transaction processing, repeaters Asynchronous Transfer Mode (ATM) connections and similar isochronous networks, thermally controlled packaging, integrated processors, network servers, cable and High Definition Television (HDTV) television, Integrated Services Digital Networks (ISDN) interfaces, and other data communication and telecommunication applications. For example, the entire switching functions provided by prior electro-mechanical switches occupying a multi-story telephone building may now be done by one or more 5 inch square modules having the connectors of this invention.

Some of the important features of this invention include:

1. A large matrix of receptacles for easily disconnectable plug connectors for a multi-chip module. (For example, a 10 square centimeter surface on a thermal conduction module may use this invention to support a matrix of 65 silicon connectors containing a total of 1755 input connectors and 1755 output connectors, each connecting coaxial cables and/or optical fibers in any mix, in which each connector may connect an average of 27 transmission lines, and each line may accommodate a large number of channels.)

2. Receptacles in a matrix may be arranged in any outline shape on a major surface of a module, such as in an array form, in a circular outline, in a square outline, etc. The circular or square outline arrangement leaves open a central area on the module on which chips may be mounted, such as for controlling switching functions for the signals to and from the connectors.

3. Any receptacle in a matrix may receive a pluggable member attached to a cluster of cables, and the receptacle may have a corresponding transmission line for each cable in the cluster.

4. Each receptacle in a matrix may receive a pluggable member capable of quick insertion, reliable retention and quick extraction.

5. A matrix of receptacles on one or both major surfaces of a ceramic multilayer module or of a multilayer thin film silicon chip carrier.

6. To provide quick connect and release means for each of a multiplicity of connectors in a matrix to obtain easy engagement/disengagement of plugs from mating receptacles supported on one or both major surfaces of a silicon chip carrier or ceramic multi-chip module.

7. Each receptacle in a matrix is fabricated in part from a silicon wafer having a matrix of slots. Each receptacle slot in the wafer is angularly formed to receive the end of a plug member. The wafer is integrated into the module to form a major surface. The slots are etched into the matrix wafer for manufacturing it at low cost.

8. Each receptacle slot in the wafer may have electrical contacts deposited on its walls for being contacted by contacts of a plug. Each slot allows the passage of light to/from a transceiver (receiver or transmitter, wherein the transmitter is comprised of at least one light-emitting diode or laser with associated driver circuitry) on the receptacle surface when a plug has an aligned optical fiber transmitting or receiving lightwave signals; each transceiver may have a lens means, such as a grin lens, in the slot-plane for the efficient collection and coupling of light between a corresponding plug fiber and a receptacle fiber.

9. The silicon wafer may comprise one of the multi-layers on a ceramic multi-layer module or a second layer on a silicon chip carrier, and, may include a power distribution network for the chips thereon.

10. Any plug received by a receptacle in a matrix of receptacles may be used to terminate a cluster of cables. A connector's cluster may include one or both of coaxial cables and optical fibers in any proportion.

11. The fabrication of the slotted wafer may also etch grooves in the underside of the wafer to contain electrical lines, which are primarily adapted for power distribution, but may be used to distribute some signals among chips on the module. Molybdenum may be deposited in these etched grooves to carry power beneath the surface of the module to chips on the module. Power may be fed to these electrical lines from an electrical line connected to a pin or to a coaxial connector which is also carrying power.

12. The receptacles in the matrix may support multiple types of connectors, in which any connector may connect a module to only optical fibers or to only coaxial cables. Multiple tiers of transmission lines may be supported in a connector.

13. A connector in a matrix may include any number of hybrid connectors. A hybrid connector connects a combination of optical fiber transmission lines and coaxial cable transmission lines to a module.

14. A plug member in a matrix receptacle may include both active and passive devices, such as passive contacts and active light-to-electrical transducers terminating optical fiber transmission lines; then electrical contacts in the plug can engage electrical receptacle contacts to transfer converted electrical signals from the optical fiber to the module.

15. To provide a matrix of pluggable receptacles providing matched-impedance to a cluster of transmission lines.

16. A cluster of transmission lines in a plug member may include semi-rigid coaxial cables, twisted copper wire pairs, flexible printed circuit lines, and/or optical fiber lines. Any connector in the matrix may be a hybrid connector terminating one or more optical fiber transmission lines and/or one or more other type of transmission lines.

17. To provide means for aligning optical fibers in a plug with corresponding optical fibers under a slot in a mating receptacle.

18. To provide slot means in a silicon wafer for precisely aligning and controlling insertion distance and deflection range for contacts of plugs in mating receptacles in the major surface of a module.

19. To enable the use of low cost manufacturing processes that etch and ultrasonically machine silicon wafers for making receptacles that can precisely align a mix of densely spaced electrical contacts, optical fibers and power distribution elements in a plug.

20. To provide a matrix of connectors, any of which may support multi-tiers of transmission lines, which may include a mix of optical fiber couplings and cantilevered electrical contacts.

BRIEF DESCRIPTION OF DRAWINGS

The invention may best be understood with reference to the accompanying drawings in which.

DETAILED DESCRIPTION OF THE INVENTION

The pluggable connector (plug) of this embodiment is used on one or both surfaces of a multi-chip module. The multi-chip module may be a multilayer glass ceramic or silicon chip carrier. A silicon chip carrier requires a molybdenum foil interface between the thin film wiring layers and the wafer surface to provide a continuous surface for sequentially processing polyimide insulated copper thin-film wiring.

Figure 1:
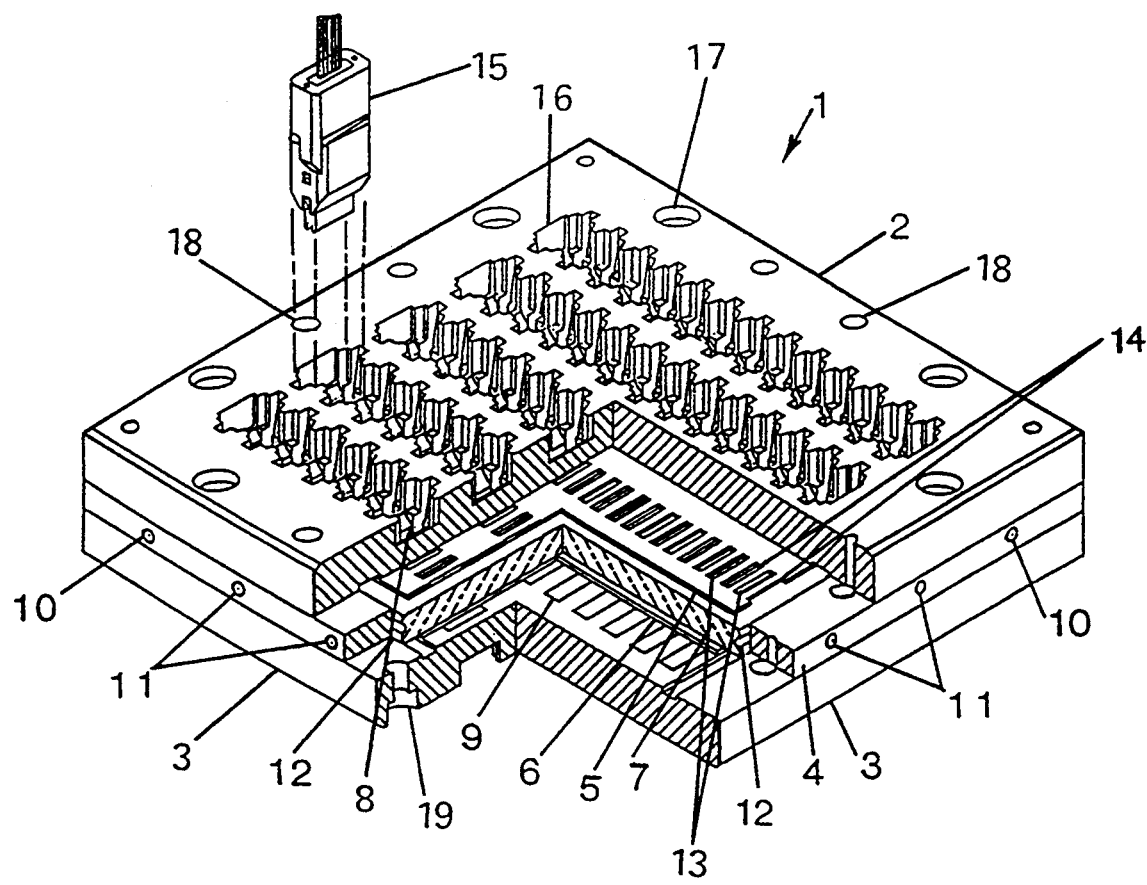
FIG. 1 is a cut-away perspective view of a large capacity cross-point switch embodiment. It has a frame around a glass ceramic substrate which may contain a network of switching logic (not shown). The frame and a major surface of the substrate support a matrix of cluster connector receptacles for receiving cluster plugs which engage slots in a silicon plate on the surface of the substrate.

FIG. 1 illustrates a partially sectioned 1755×1755 cross point switch, in which any of 1755 inputs may be connected to any of 1755 outputs; this requires 65 connector receptacles on each module surface, in which each receptacle can receive a plug having a cluster of 27 cables. Module assembly 1 comprises an upper array connector housing (frame) 2, a lower frame connector housing (frame) 3, a module substrate 7 and a housing alignment frame member 4. Silicon slotted receptacle wafers (frame connector actuation members) 5 and 6 are bonded to the top and bottom surfaces, respectively, of the glass ceramic multilayer substrate 7. The upper connector housing 2 has pins in its corners to align the upper connector receptacle matrix to the lower connector receptacle matrix having slots aligned in receptacle holes in housing 3. The substrate retention and alignment frame 4 has clearance holes in its corners so as to permit pins of housing 2 to be constraint free during registration of lower and upper array connector actuation wells 8 and 9 of housing 2 and 3, respectively. Spring biased alignment screws 10 located in the corners of the substrate retention frame 4 provide for the x and y displacement and rotation of the substrate to register contact receiving wells 13 to contact actuation wells 8 and 9. Spring loaded screws 11 along the sides of substrate retention frame 4 provide compliant support and horizontal position to the substrate 7 by being seated in grooves 12 along the substrate sides.

Alternating slots 13 in the silicon actuation connection member 5 are receptacles for the contacts of the connector assembly 15. Alternating slots 14 are inspection and repair access slots for integral bonding leads connected to contact lands located on the inclined surfaces of contact actuation slot 13. Connector assembly 15 may be inserted into any array connector receptacle 16 of housings 2 and 3.

Holes 17 accept screws, not shown, for engaging tapped holes in array connector housing 3. Similar holes 19 in array connector housing 3 engage tapped holes 18 in array connector housing 3.

Figure 2:
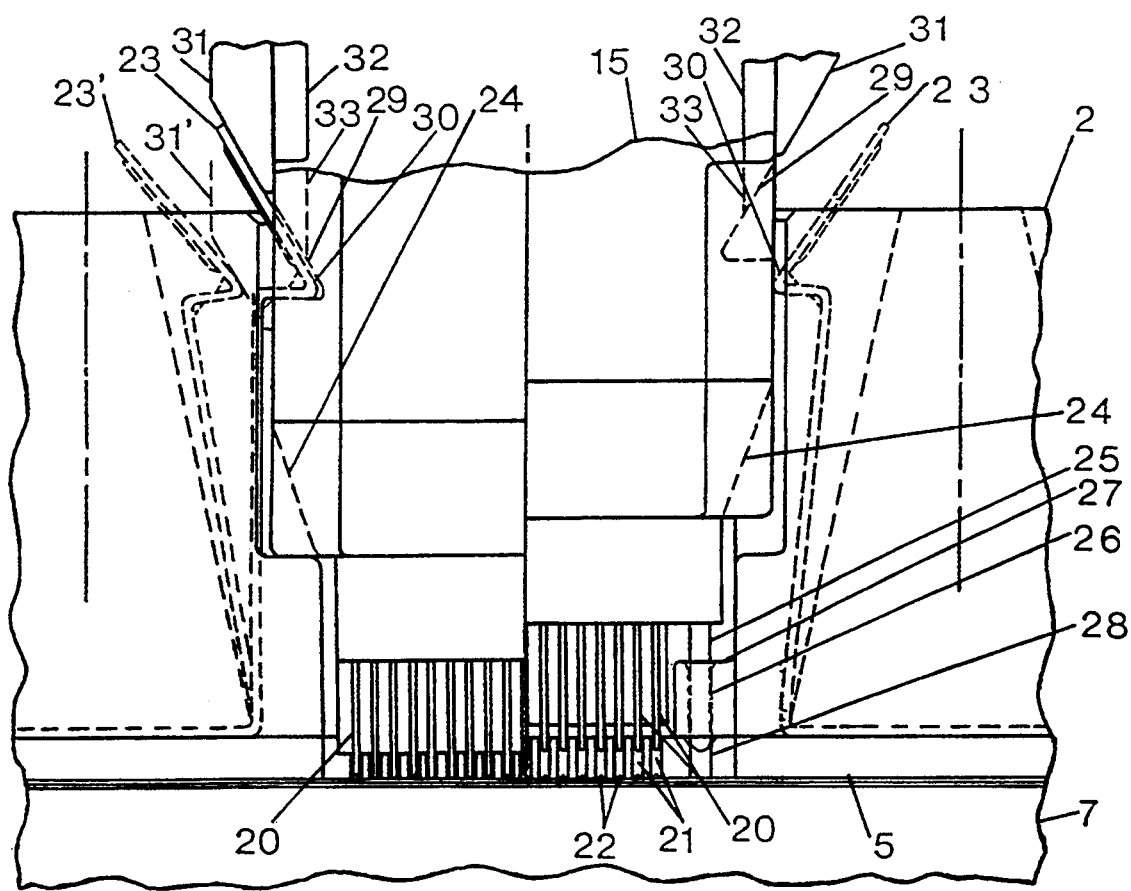
FIG. 2 is an enlarged cross-sectional view depicting various stage of mating and unmating of a plug in a receptacle.

FIG. 2 is an enlarged cross-sectional view showing various engagement stages of the pluggable array connector 15 into the silicon contact actuation member 5. The right half of array connector 15 is shown prior to engagement of contacts 20 on inclined lands 21.

The left half of pluggable array connector 15 shows contacts 20 fully deflected along inclined lands 21. Transverse copper wires 22 are soldered in metallized v-grooves that connect lands 21 to suitable pads on the ceramic substrate 7, which are accessible in adjacent inspection/repair slots of silicon actuation member 5. Upper connector array housing 2 has captive retention springs 23 on opposed ends of connector receptacle slot 16. During insertion of connector assembly 15 as shown by the right half, spring 23 is deflected from the normal by ramp 24. Guide pin 25 positions contacts 20 relative to respective lands 22 when it engages alignment hole 26 in boss 27 of upper array connector housing 2. Slot 28 in silicon actuation member 5 is an opening to permit passage of pin 25 during final insertion as shown by the right half of connector assembly 15. Retention of connector assembly 15 occurs when depression 29 along both edges of connector assembly 15 are aligned with protrusion 30 on cantilever retention springs 23. Cantilever retention springs 23 snap into depressions 29 locking contacts 20 in the deflected condition along inclined lands 21. Horizontal force components due to deflection of contacts 20 act on contact land 21 with the desired contact force.

Release of connector assembly 15 is effected by activating tapered plungers 31 downward to move cantilever retention spring 23 away from the edges of connector assembly 15. Connector assembly 15 is ejected upwards when protrusions 30 are out of depressions 29. Key 32 on tapered plunger 31 is secured in channel 33 and moves to a position reflected by 31'. Cantilever retention spring 23' shows the position of retention spring 23' at the end of downward movement of tapered plunger 31'.

Figure 3:
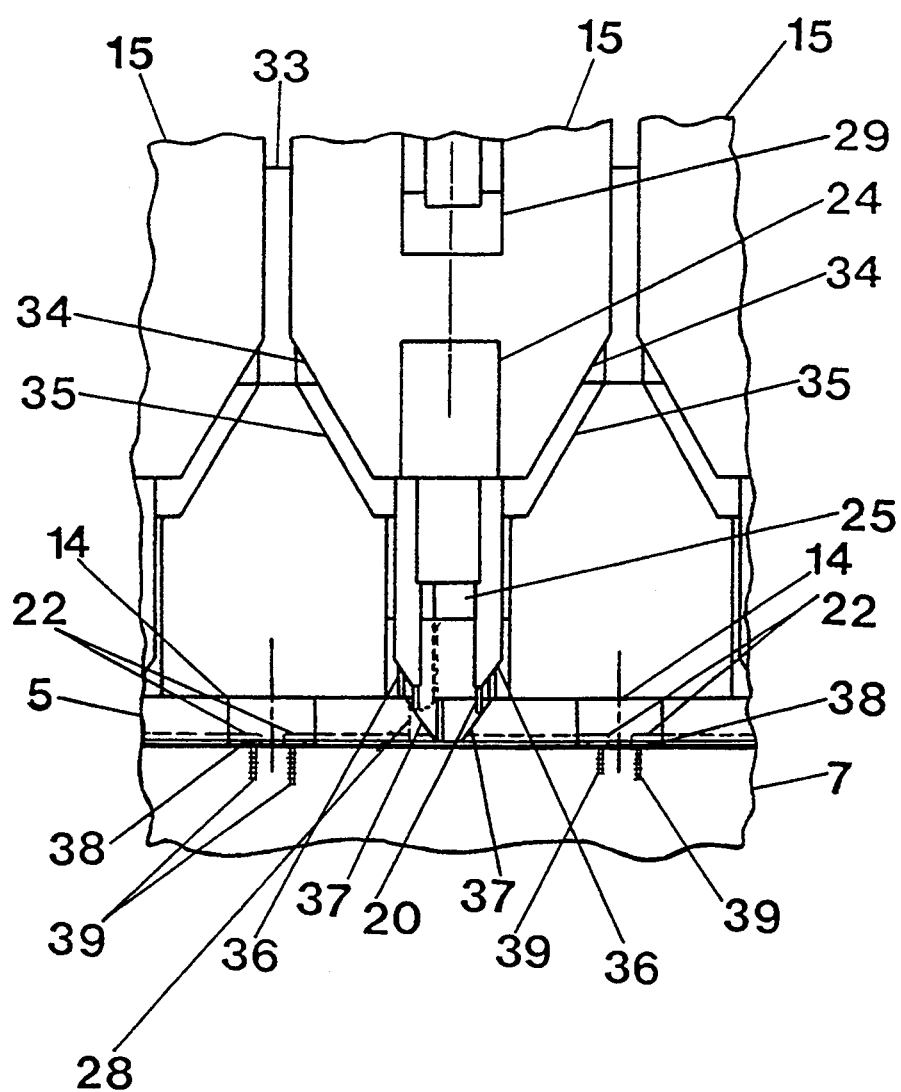
FIG. 3 shows an enlarged cross-section of the end view of the connector prior to final insertion and retention into a silicon receptacle slot.

FIG. 3 illustrates a side view of connector assembly 15 prior to final insertion into contact actuation member 5. Beveled sides 34 of connector assembly 15 will seat on tapered sides 35 of upper connector array housing 2 when connector assembly 15 is fully inserted into silicon contact actuator 5. This limits stress when bevel on silicon contact support member 36 contacts opposed inclined surfaces 37 of silicon contact actuator 5.

Transverse contact leads 22 soldered into v-grooves are connected to contact lands disposed along inclined surfaces 37 and soldered to metal pads on the surface of multilayer ceramic substrate 7. Pads 38 are connected to vias 39 that connect to internal wiring in substrate 7. Slots 14 permit access for inspection and repair of soldered connections.

Figure 4:
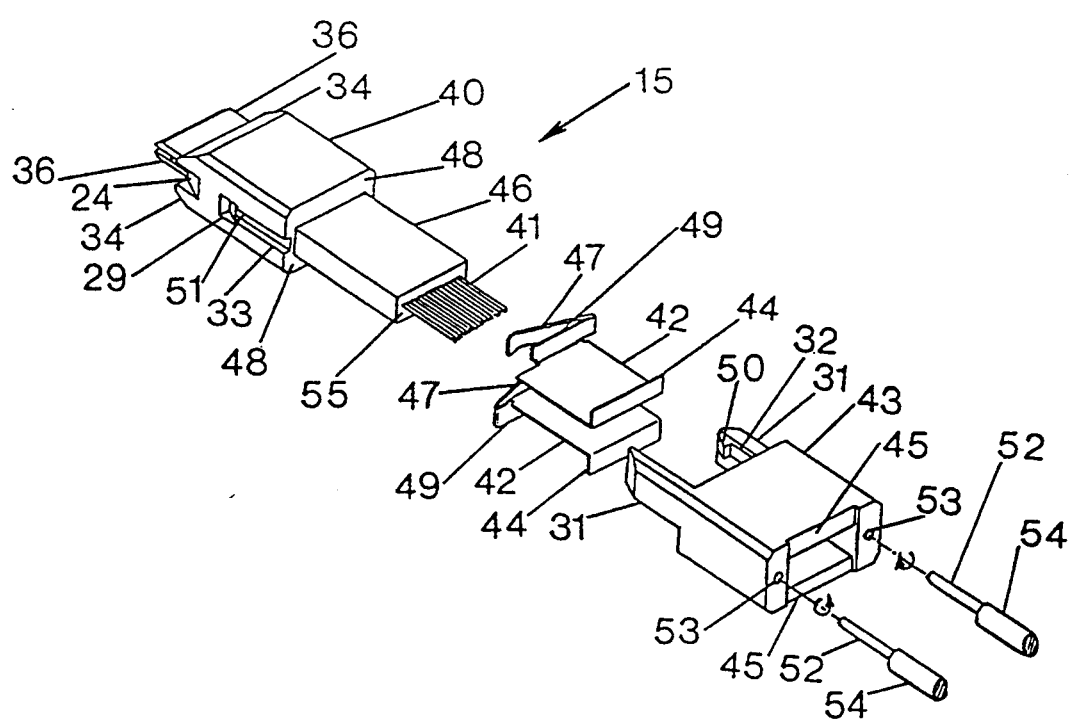
FIG. 4 shows an exploded view of a plug and its integral insertion/release mechanism.

FIG. 4 is an exploded perspective view of connector assembly 15. The connector assembly has means for insertion and extraction into a dense array of similar assemblies, since its sides are not available for manual insertion.

Molded housing assembly 40 contains a contact or optical fiber group disposed in silicon support members 36 and internal means for connecting the contact/optical fiber group to appropriate wiring means 41. Said wiring means may be coaxial cables, optical fiber cables, discrete electrical wires, twisted wire pairs or flexible printed circuit elements. Spring members 42 are inserted into rectangular apertures in slider 43 so that tabs 44 are seated in recesses 45 at the rear of slider 43. With spring members 42 so disposed, slider 43 is mounted over the rear body 46 of molded housing assembly 40 and moved forward compressing flat springs 47 between shoulder 48 and tabs 49. Continued movement of slider 43 with key 32 engaged in channel 33 secures slider 43 to molded housing assembly 40 when protrusions 50 engage wells 51.

A pistol-grip tool with a yoke, not shown, has a pair of pins 52 spaced so as to engage holes 53 at the rear of slider 43. When eccentric cam lobes 54 are oriented inward so as to engage surface 55 at the rear of molded housing assembly 40, connector assembly 15 can be inserted into the appropriate position in the array and snapped into position so that retention springs 23 engage wells 29 on the edges of connector assembly 15. The yoke, part of the pistol-grip tool, not shown, permits engaging the rear of slider 43 without disturbing cables 41 or other nearby cables 41 of the array. Extraction of connector assembly 15 requires insertion of pins 52 in holes 53 with eccentric cam lobes 54 rotated downwards so that slider 31 can advance and dislodge springs 23 from wells 29. Normal reactive forces at the contact ends ejects connector assembly 15 away from connector array housing 2.

Figure 5:
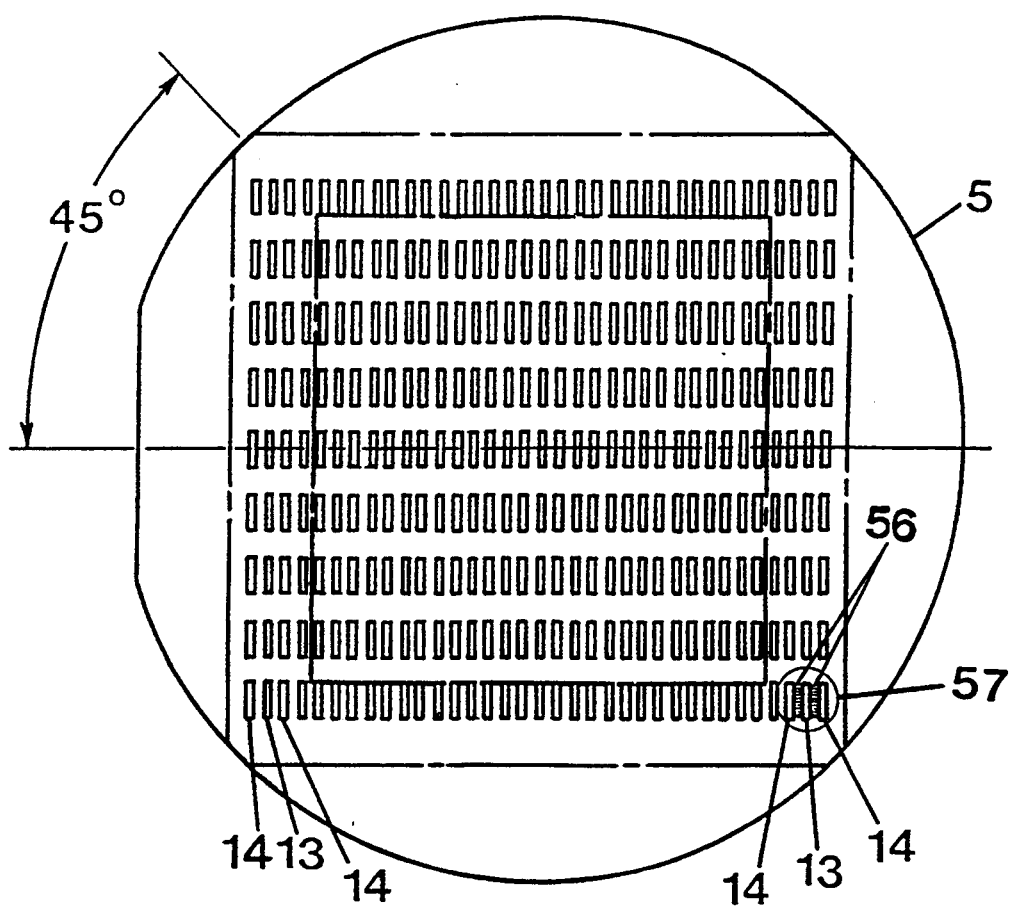
FIG. 5 illustrates a slotted receptacle plate component that can be processed, for example, on an 8 inch diameter silicon wafer.

FIG. 5 illustrates an 8 inch wafer with a 9×17 array of silicon actuators processed therein. This provides a capability consistent with current multilayer ceramic substrates and yielding a 4131×4131 cross point switch capability for the invention of this disclosure. This maximum array may be down sized to fit any substrate size.

Inset 57, a typical detailed representation of any 3-aperture group in the wafer has alternating inspection and repair apertures 14 straddling alternating contact actuation apertures 13 throughout the array. Preferentially etched v-grooves 56 have copper wires 22 soldered to steam oxidized and metallized v-grooves. Wires 22 extend into inspection/repair apertures 14 a predetermined distance. Photolithographically located wires 22, make it possible to align 4,131 wire ends to a similar photolithographically determined pad array 38 on the surface of a glass ceramic substrate 7. Alignment of the fiducial of the pad array and the v-groove array during bonding of silicon actuation structure to the substrate surface results in excellent registration for soldering.

The fabrication process for the silicon connector actuator is as follows:

a) An oversized silicon wafer (0.035 in. thk.) is suitably ground and polished.

b) V-grooves are preferentially etched on 0.018 in. pitch in the appropriate wafer surface.

c) Ultrasonic machine array of inspection/repair apertures 14 in the wafer.

d) Steam oxidize all wafer surfaces and selectively metallize v-groove walls.

e) Place and locate 0.005 in. diam., Ni-plated copper wires in metallized v-grooves and solder in place.

f) Ultrasonic machine array of contact actuation apertures 13 in appropriate wafer surface.

g) Repeat steam oxidation process.

h) Laser assisted deposition of Ni and Au contact lands 21 on inclined walls 37 of actuation apertures 13.

i) Screen solder/flux paste on pad array 38 of glass ceramic substrate 7.

j) Indent solder/flux on pads 38 so as not to interfere with wires 22 during placement and alignment of silicon actuator 5 on glass ceramic substrate 7.

k) Align silicon actuator 5 to pads 38 on glass ceramic substrate 7 and under heat and pressure bond silicon actuator 5 to appropriate surfaces of glass ceramic substrate 7 using an appropriate polyimide adhesive.

l) Rinse flux off of solder joints between wires 22 and pads 38 and bake dry.

Figure 6:
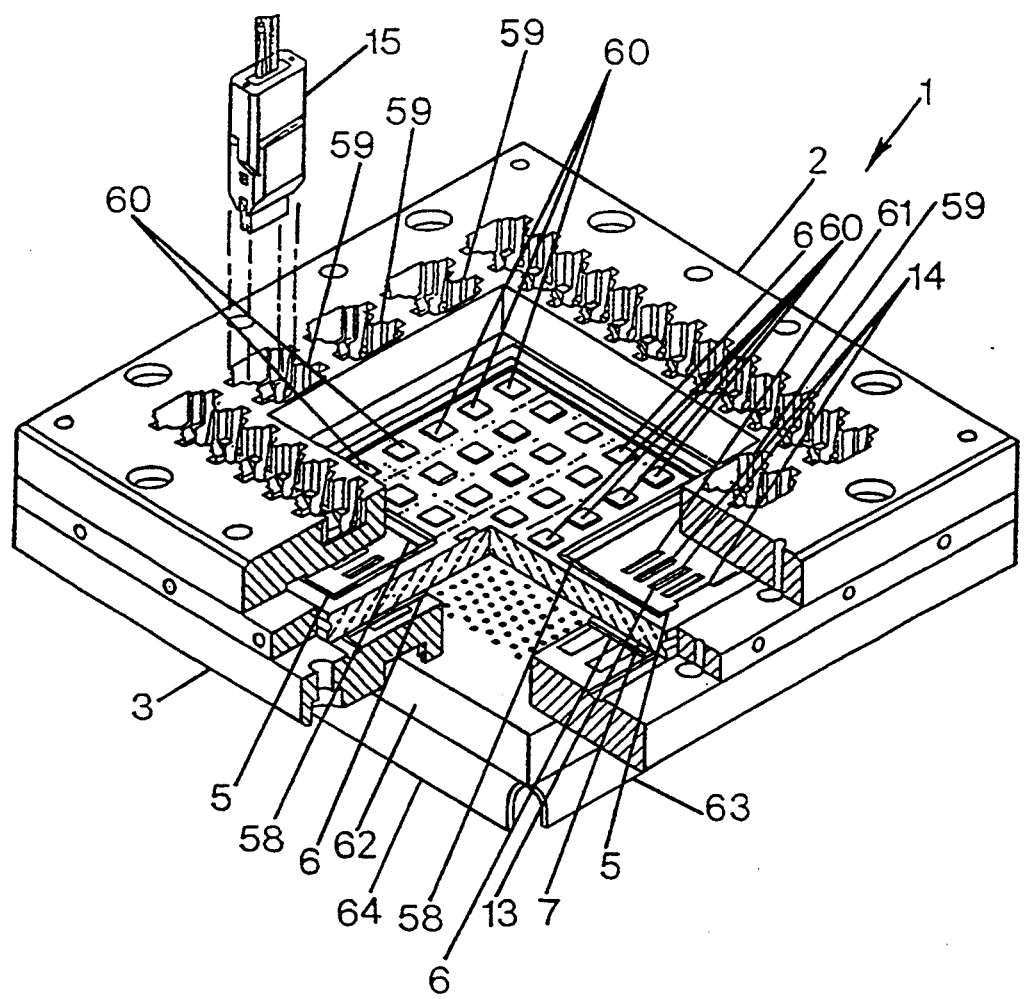
FIG. 6 illustrates a partial cross-section of a partial connector matrix on both surfaces of a ceramic substrate with a partial chip array centrally located on the substrate surface, and power and signal distribution located on the module side opposite to the chip array.

FIG. 6 illustrates a partial array connector housing 2 and 3, located on the top and bottom surfaces of substrate 7. The central region of housing 2 and silicon actuation structure 5 have openings to allow for an array of semiconductor chips 6.

Silicon actuation structure 5 has a smaller opening than housing 2 in order to accommodate a metal seal band 58. Seal band 58 provides for solder or epoxy bonding of a suitable air-cooled heat sink, not shown. Pluggable connector receptacles 59 are optimally disposed to provide optical fiber communication to photonic receivers on semiconductor chips 60. Half the contacts in aperture 61 could be devoted to optical fibers and distributed through a system of v-grooves on the underside of silicon actuation structure 5 so as to pass under seal band 58. A single repair/inspection aperture 14 would be required for a pluggable connector 15 configured for a 50% complement of optical fibers.

To accommodate optical fibers along the edge of chips 60, all flip-chip bonding-pads would have to be built up above the substrate surface by 50 microns; this can be done in a number of ways known in the art, e.g., additional metal deposition on flip-chip bond-pads, C-4 elongation by use of selective over sized C-4's, or, solder posts. If multi-level polyimide insulated thin-film wiring is used on the top surface of substrate 7 a 50 micron depression could be etched in the wiring layers. Depressions in the wiring layers would allow dressing and bonding optical fiber ends with angled end facets for diverting optical paths upwards to photonic receivers on semiconductor chips 60. Similar considerations could be employed with laser bars disposed in proximity to chip 60 to effect data transmission.

Lower array connector housing 3 and silicon actuation structure 6 have appropriate openings to accommodate a conventional connector system 62 for a pin array located on the underside of substrate 7. Connector system 62 would have to be modified to operate within the opening in housing 3 due to use of a complementing partial connector array on the substrate underside.

Connector system 62 would also be capable of providing power and signal distribution on the underside of substrate 7. Conventional flexible printed circuit signal member 63 and power distribution member 64 are shown with downward feed to satisfy operation within the open area in lower housing 3.

Figure 7:
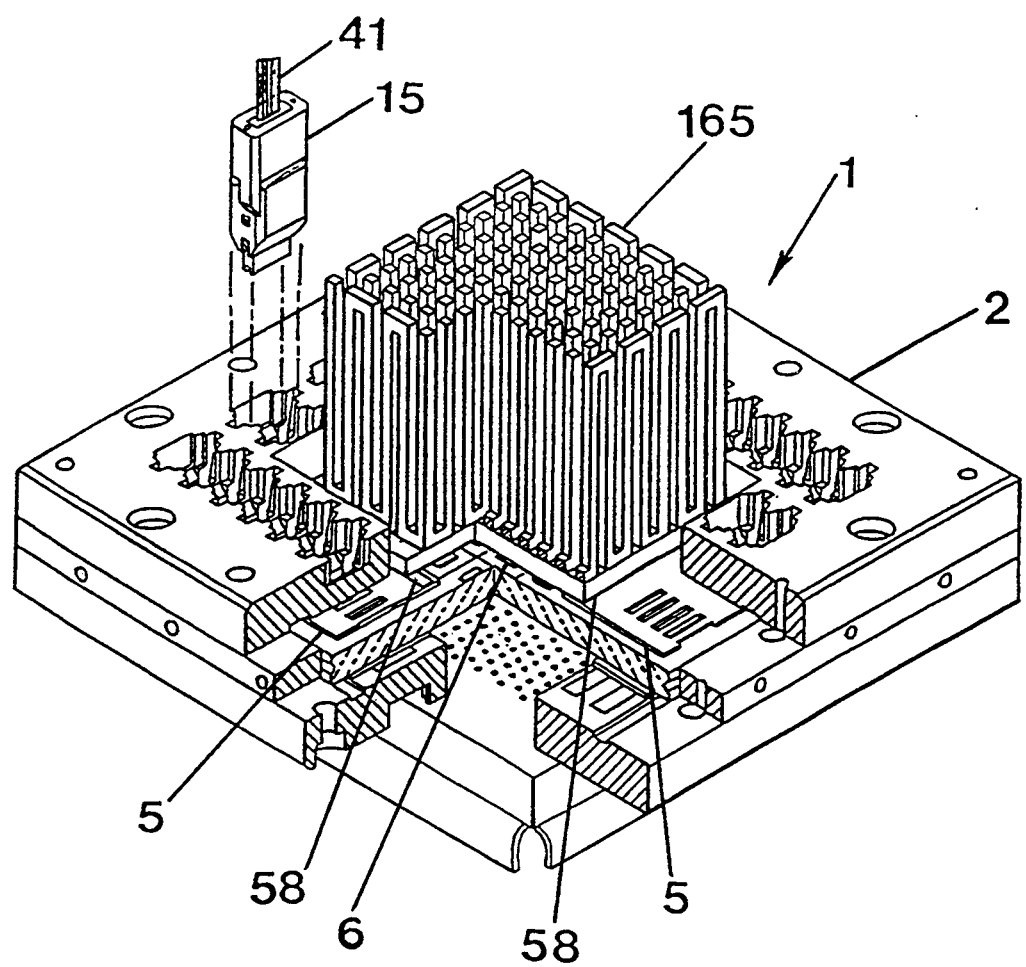
FIG. 7 shows the structure of FIG. 6 with air cooling means in the central portion of the module and frame.

FIG. 7 illustrates an air impingement heat sink 165, known in the art, and, bonded to seal band 58 of upper silicon actuation structure 5. This top entry air cooling means is best suited for module assembly 1 due to horizontal air flow blockage posed by the projection of pluggable connector 15 and related wiring media 41 above connector housing 2. Heat sink 165 is coupled to chip array 6 by a thermal grease compound.

This module assembly with semiconductor chips can serve as a channel distribution box with reconfigurability or redundancy in the event of a failure. It is a stand alone capability and may be mixed in an array with the full hard wired switch, FIG. 1, described earlier.

Figure 8:
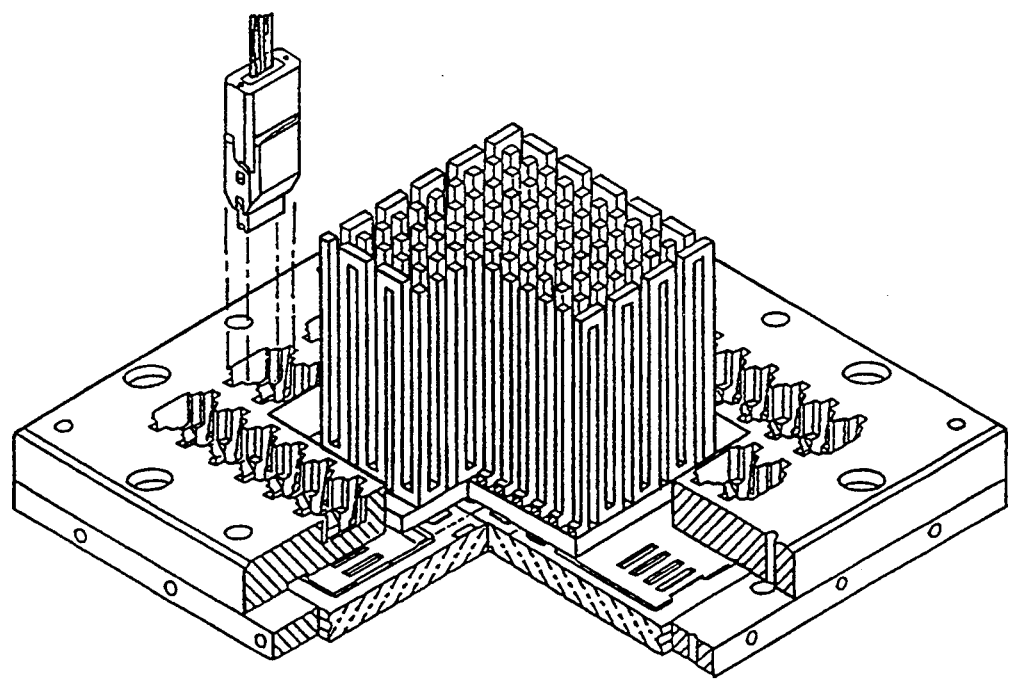
FIG. 8 shows the structure of FIG. 7 receiving a plug.

FIG. 8 illustrates the partial pluggable array connector configured for use with a printed circuit card or board. Pins are conventionally brazed to the under side and are capable of being mixed with conventional TCM's.

Figure 9:
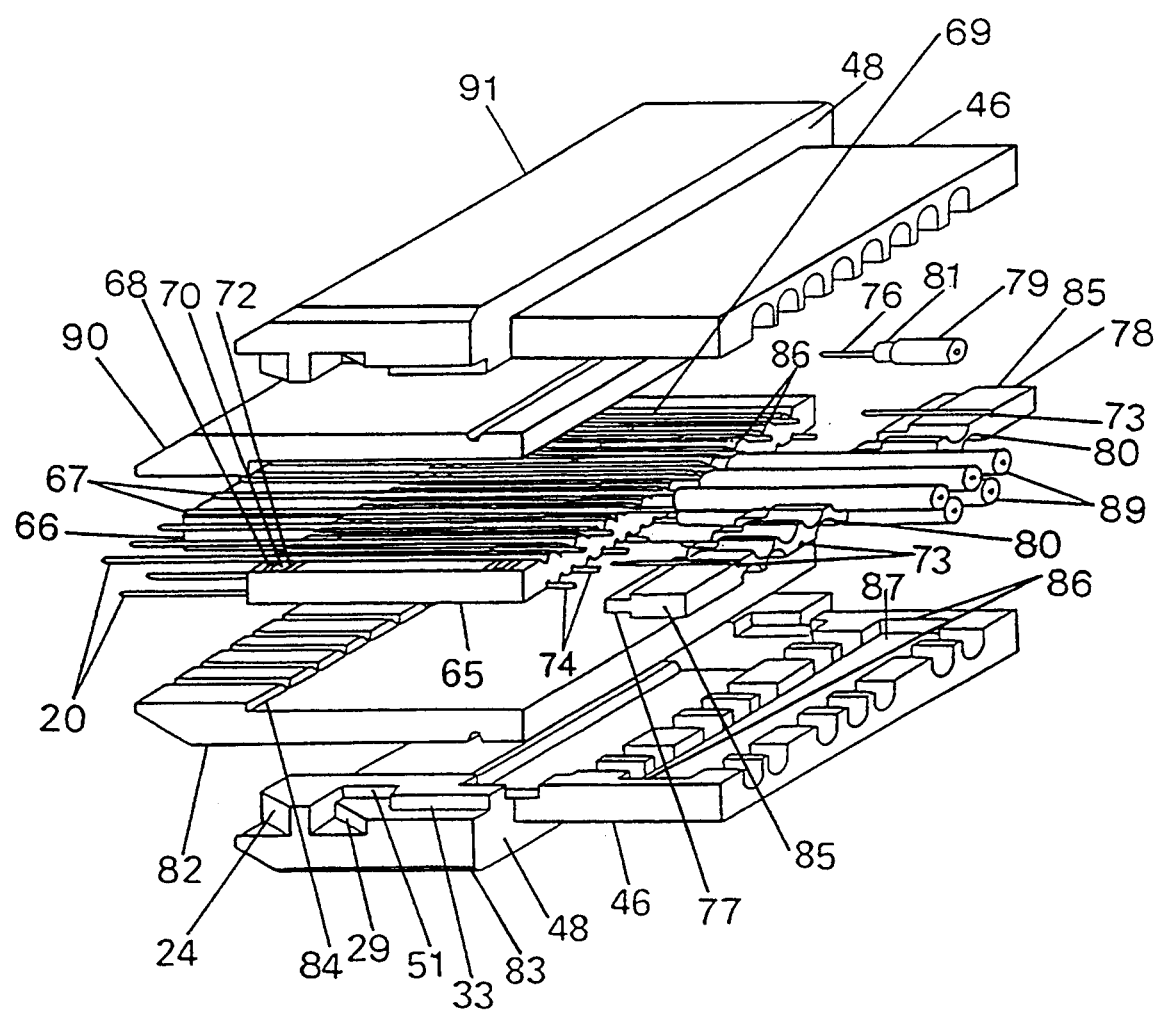
FIG. 9 illustrates a hybrid connector plug supporting coaxial cables and optical fibers.

FIG. 9 illustrates an exploded view of a hybridized coaxial cable and optical fiber pluggable connector assembly. Silicon contact and fiber support member 65 is preferentially etched on both sides to have v-grooves disposed in a staggered format. At the wafer level, after v-groove etching, apertures are ultrasonically machined to define extension 66 for supporting optical fibers 67. The wafer is then steam oxidized and v-grooves selectively metallized. Quartz insulating strips 68 are deposited transverse to the v-grooves at the front, rear and on both surfaces. Openings are made in quartz strips 68 at each grounding v-groove 69. Electrically conductive straps 70 are deposited over quartz strips 68 connecting alternately spaced ground reference v-grooves 69. A second quartz insulating strip 72 is deposited over electrically conductive strap 70 and openings made over v-grooves aligned with grounding pins 73. Silicon contact and optical fiber support members 65 are then diced from the wafer.

Cantilever contacts 20 are located in appropriate v-grooves with ends a specified distance from the ends of silicon contact and optical fiber support member 65 and soldered.

Simultaneously, ground pins 74 located in metallized v-grooves 69 are soldered using the same solder alloy. Ground pins 73, 74 and center conductor 76 of miniature semi-rigid coaxial cables are soldered to shelf 77 of metal cradle 78 and appropriate v-grooves in silicon contact and optical fiber support member 65 with a lower temperature solder alloy. Outer conductor 79 of the coaxial cable and ground pins 73 are soldered to metal cradle 78 with the same solder alloy used for cantilever pins 20. Faceted ends of optical fibers 67 are oriented and soldered to extension 66. Concave grooves 80 are positioned to align center conductors of coaxial cables and optical fiber cores with the silicon contact and fiber support member 65. Center conductor 76 is insulated from outer conductor 79 by insulator 81.

Silicon contact and fiber support member 65 with attached metal cradle 78, coaxial cables, and, optical fiber cables are placed on the lower silicon support member 82 so that its front edge is constrained by step 84. Ends 85 of metal cradle 78 are nested in wells 86. Contacts 20 and optical fibers 67 are bonded in v-grooves 86. Elastomer pad 87 in recess 86 is compressed about outer conductors 79 and optical fiber cables 89 when upper silicon support member 90 and upper plastic housing 91 are assembled and bonded to lower silicon support member 82 and lower plastic housing 83.

Figure 10A:
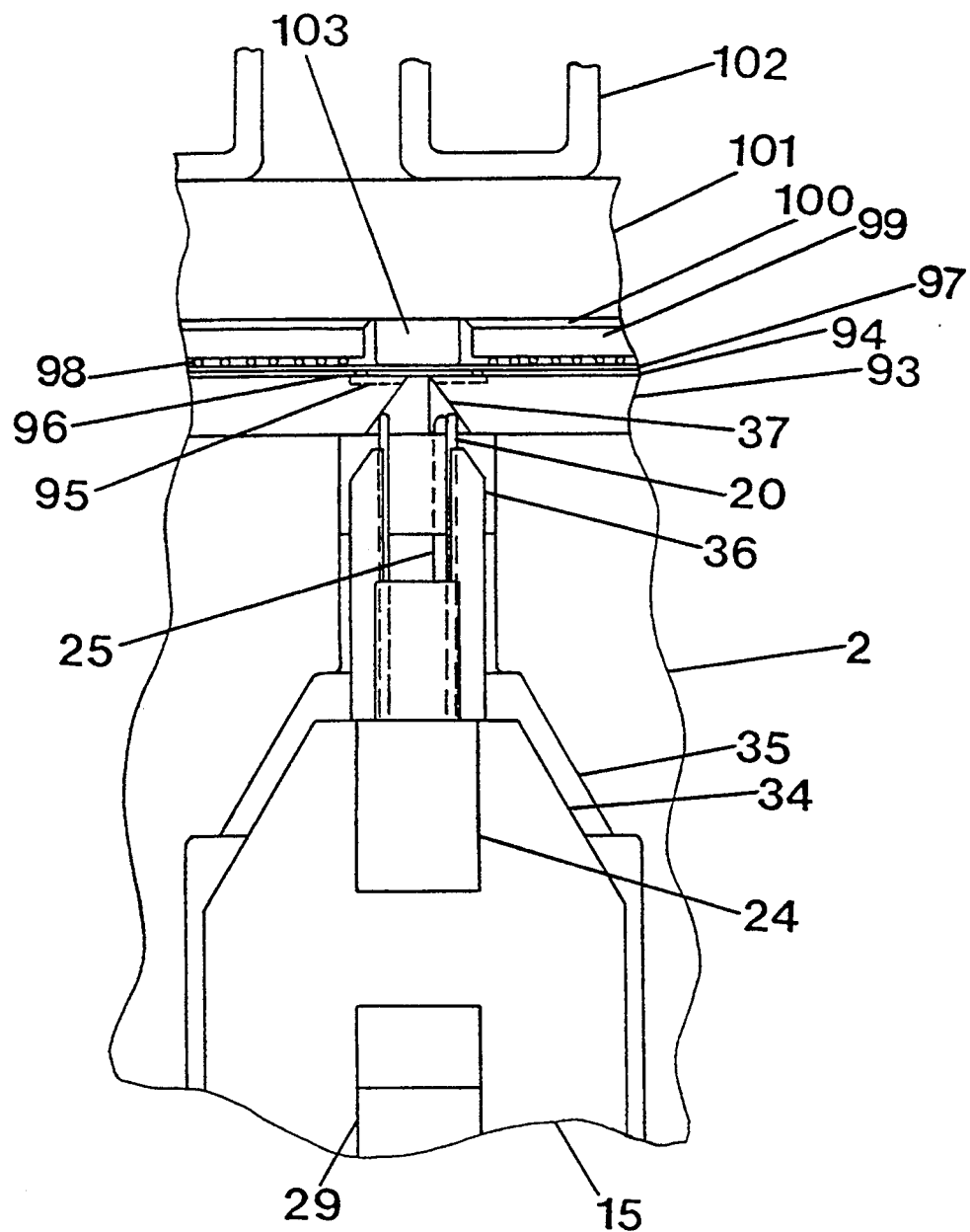
FIG. 10A shows electrical contacts in a hybrid coax/optical fiber connector and their connection path to a semiconductor chip.

FIG. 10A shows an edge view of a pluggable connector integrated into a silicon chip carrier with connector insertion and extraction performed at the chip carrier underside. Pluggable connector operation was previously described and will not be repeated here. Silicon chip carrier processing will be modified to include tapered slots for accepting a pluggable connector. Also, surface planarity restoration to accept polyimide insulated thin-film wiring will be described.

A fabrication process for integrating the pluggable connector to the underside of a silicon chip carrier could be:

a) A silicon wafer of min. 0.035 in. thick is suitably lapped and polished.

b) Preferentially etch v-grooves on 0.018 in. pitch at appropriate locations on the wafer.

c) Steam oxidize wafer surfaces and metallize v-grooves.

d) Place triangular Ni plated copper wire contactors in v-grooves and braze.

e) Planarize surface.

f) Ultrasonic machine contact actuation aperture array on appropriate wafer surface flushing triangular wire ends to the angled surfaces of the actuation apertures.

g) Steam oxidize.

h) Remove oxide from wire ends and Ni flash ends.

i) Etch appropriate windows on Molybdenum clad surface of a polyamide film (500 deg. service temperature) clad on both surfaces with ⅛ oz. of molybdenum and ⅛ oz. of Copper or Aluminum.

j) With a blocking mask over wafer surface metalized area about v-grooves.

k) Orient clad polyimide so that etched windows match metal free regions on wafer and solder molybdenum pattern to matching metallization pattern on wafer using 73% Gold-27% Indium alloy (solidus/liquidus 451 deg. C.).

l) Etch openings in copper or Aluminum and laser ablate corresponding openings through polyimide to expose part of triangular Ni plated Copper segments in v-grooves.

m) Mask and metallized connections from Ni plated Copper segments to surface of polyimide.

n) Personalize Copper or Aluminum on polyimide surface to form first metal level of the multilayer wiring structure.

Referring to FIG. 10A, the silicon chip carrier 93 is shown with the Molybdenum/Polyimide layer 94 disposed over its surface so that contacts 20 may displace to the bottom of inclined land 37 and engage the polyimide without being electrically shorted. Triangular wire segments 95 conduct electrical signals from contact 20 through plated up vias 96 into the multilevel wiring structure 97 and through solder joints 98 to electrical circuits on semiconductor chip 99. A thermal conducting grease 100 couples chip 99 to a thermal spreader 101 that contacts a serpentine fin structure 102, thereby providing an efficient path to extract dissipated heat. Extension 103 from bottom of thermal spreader 101 engages surface of multilevel wiring structure 97 to limit deflection of silicon chip carrier 93 when pluggable connector 15 is inserted.

The connector of this invention provides 121 contacts/sq. in. compared to current TCM connection density of 153 contacts/sq. in.

Figure 10B:
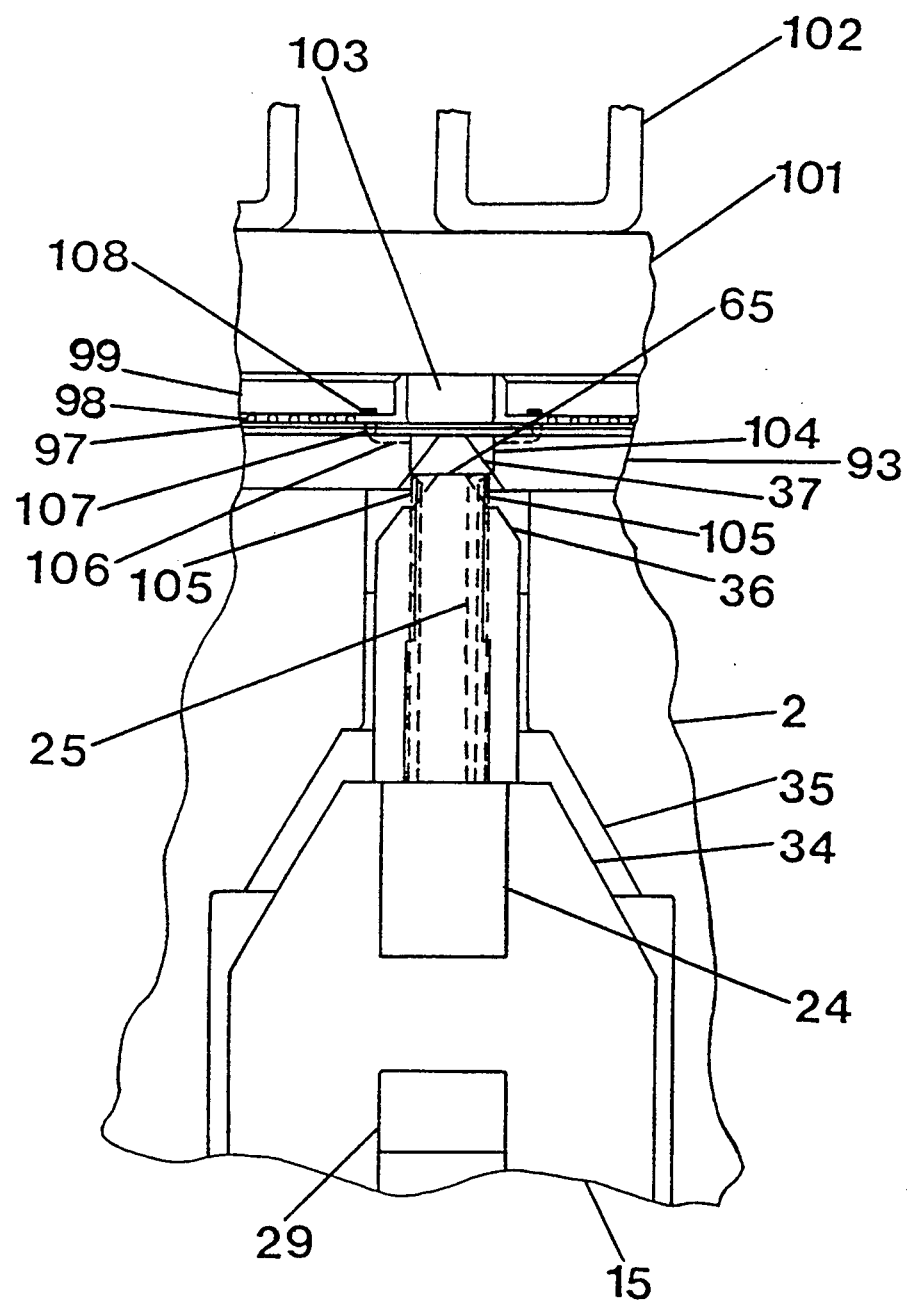
FIG. 10B shows an optical fiber coupling for a hybrid coax/optical connector having an optical path to a semiconductor chip.

FIG. 10B shows a different section of hybridized pluggable connector 15 with fiber support member 65 disposed prior to insertion. Vertical sidewalls 104 are simultaneously produced during ultrasonic machining of tapered walls 37. Vertical sidewalls allow clearance for fiber support member 65 to travel to the bottom of the tapered cavity during insertion of connector 15. When fully inserted, faceted ends of optical fiber 105 are aligned with ends of grin lens 106. The ends of grin lens 106 are in turn faceted to divert optical data upwards through opening 107 in multilevel wiring structure 97, aligned with optical receiver 108 on chip 99.

Figure 10C:
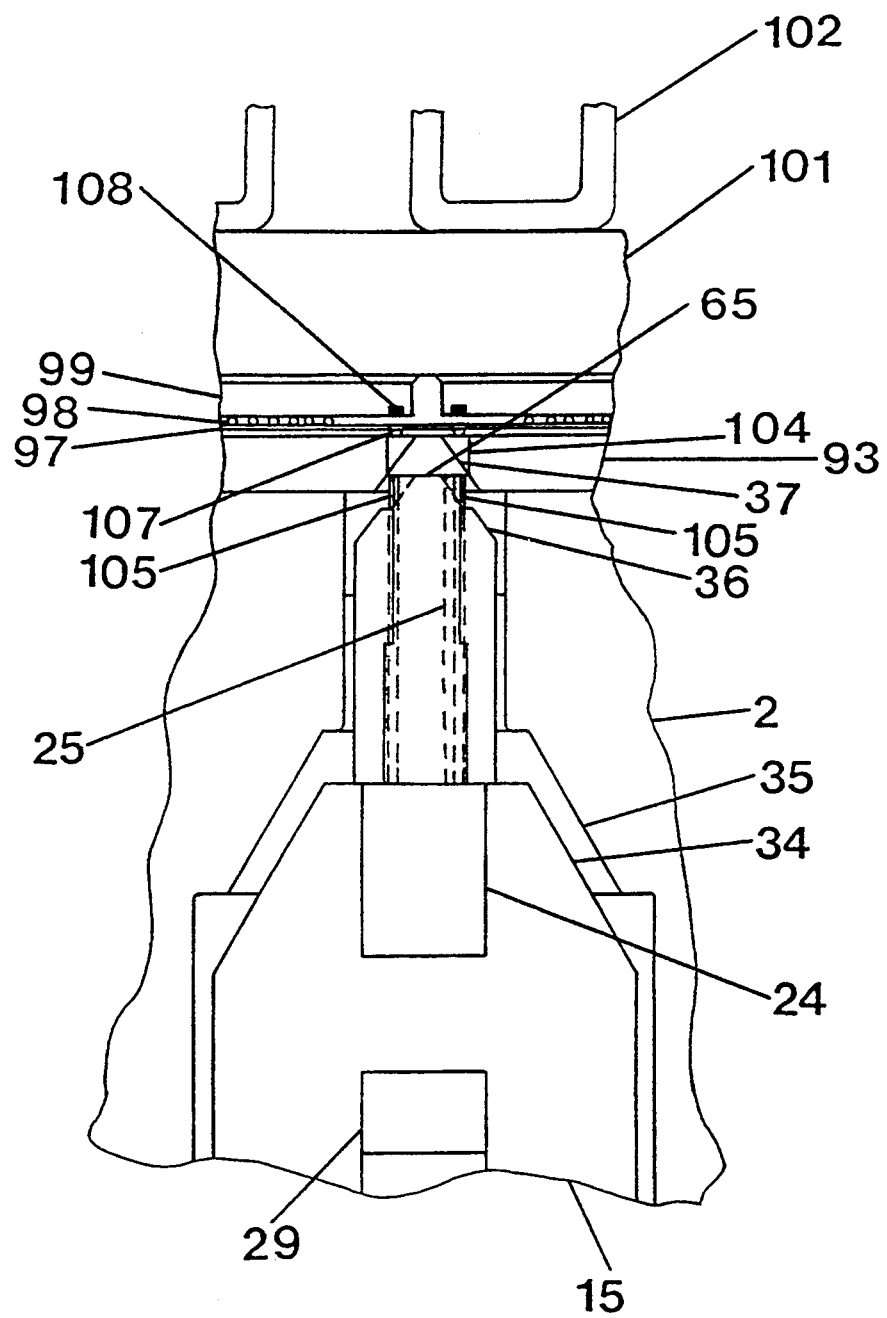
FIG. 10C shows an optical fiber part of a hybrid coax/optical fiber connector with an alternative optical path to a receiver on a semiconductor chip.

FIG. 10C illustrates an alternative optical fiber connector configuration. The deflection limiting extension 103 is disposed transverse to the plug insertion axis between semiconductor chips 99 which are placed closer together so that optical fibers 105 are axially aligned with photonic devices 108 on semiconductor chips 99. This alternate configuration eliminates the need for ancillary coupling elements (such as faceted fiber or GRIN lens studs, or, other lens means.

Figure 10D:
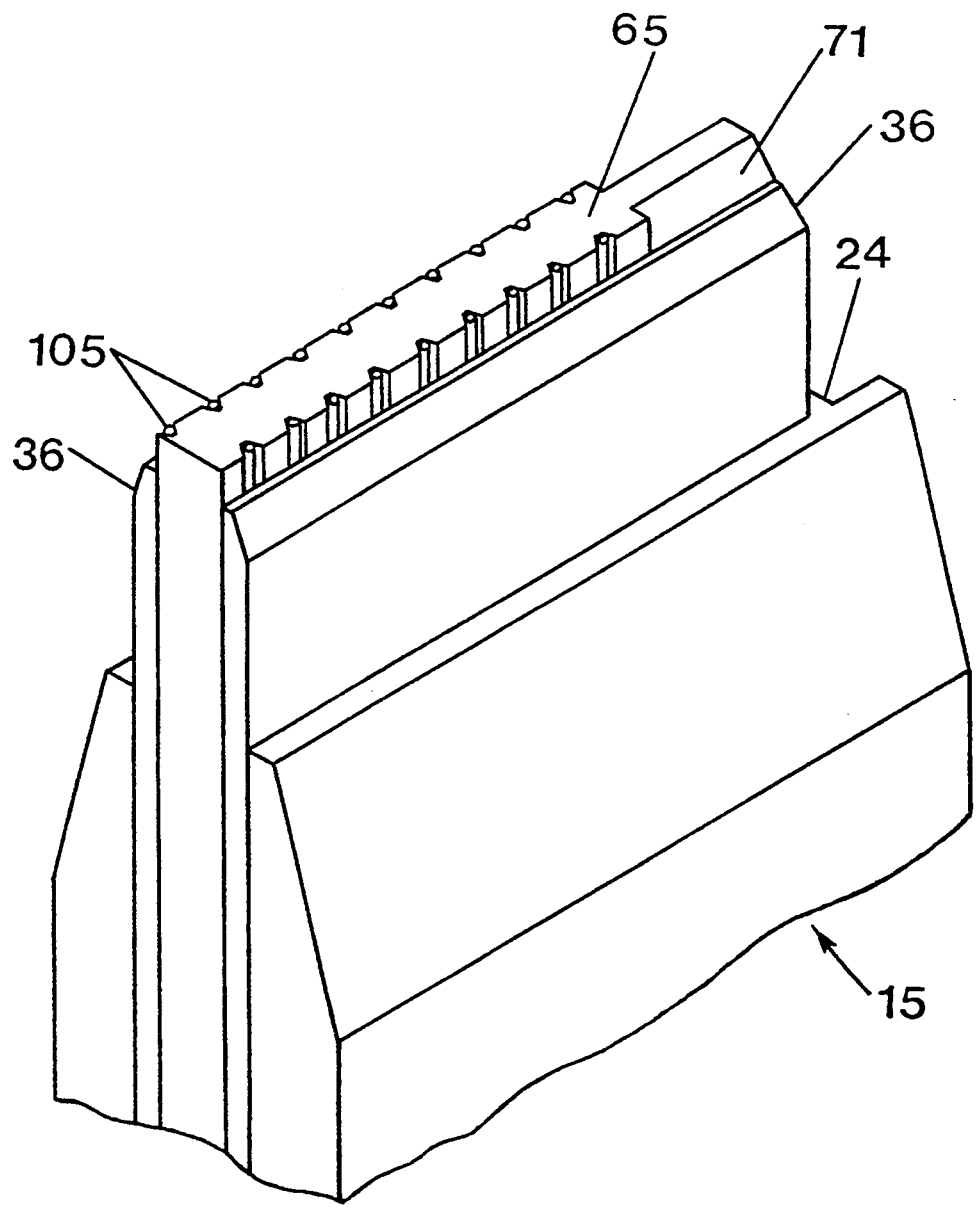
FIG. 10D illustrates a partial isometric view of the plug member configured for optical fibers.

FIG. 10D illustrates a partial isometric view of a pluggable optical fiber member 15 configured for use with the receptacle of FIG. 10C. The tapered edges 71 seat along conjugate tapered edges 37 of the receptacle shown in FIG. 10C to accurately center the pluggable member 15 in the receptacle. If the optical fiber ends 105 were suitably faceted the pluggable member 15 would be configured for use with the receptacle of FIG. 10B.

Figure 10E:
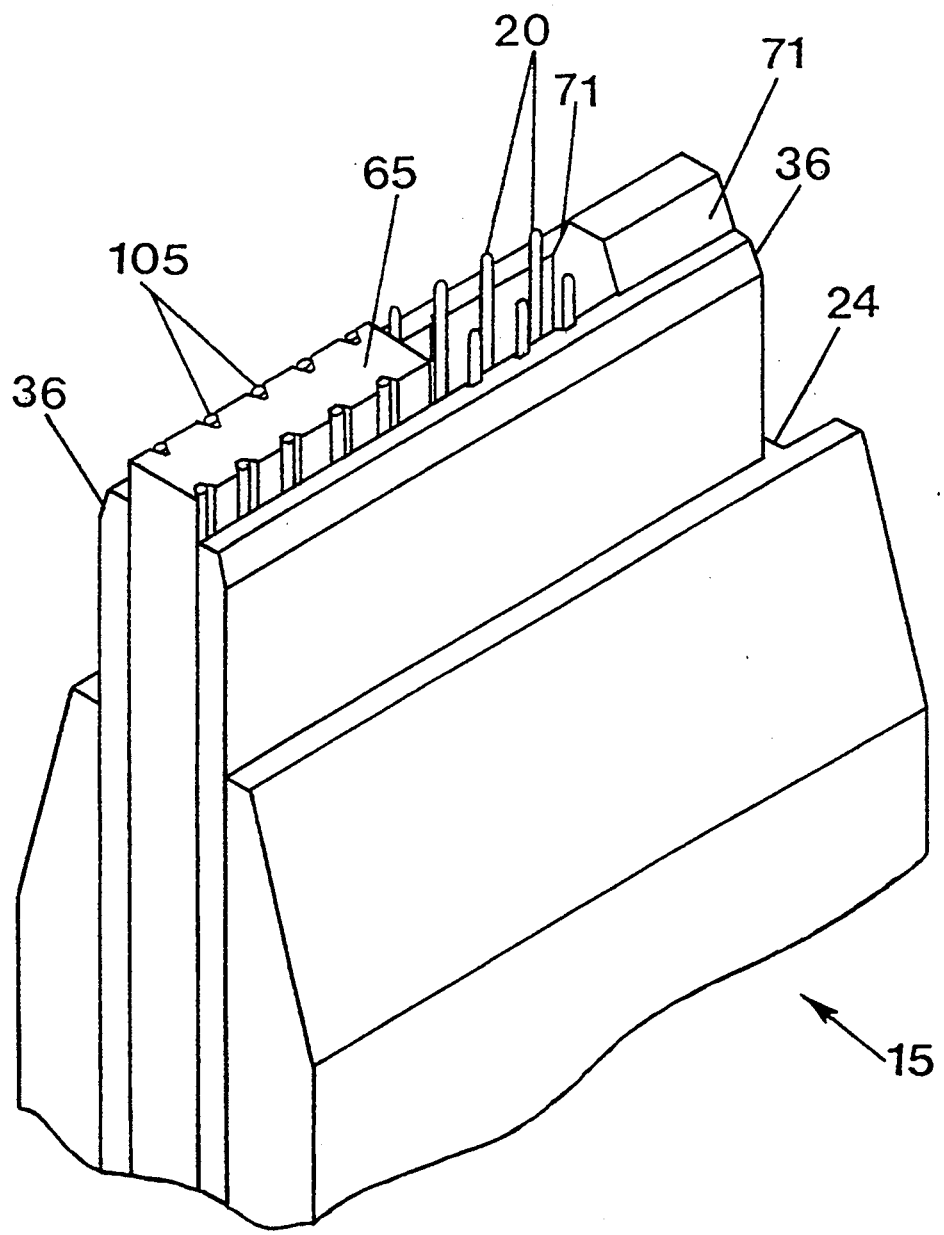
FIG. 10E illustrates a partial isometric view of the plug member in a hybrid configuration for both optical fiber and coaxial electrical contacts.

FIG. 10E shows a partial isometric view of a pluggable member 15 with optical fibers and coaxial electrical contact elements disposed along the edges of silicon member 65. This hybrid disconnectable connector interface is accommodated by the receptacle of FIG. 10C by extending the tapered section 37 into the corresponding region of the pluggable member containing the coaxial contacts 20. Suitable contact lands and electrical pathways, previously described, are implemented accordingly. The desired mix of coaxial contacts are equally distributed symmetrically at both ends of silicon member 65 so as to preclude unbalanced reactive forces during mating of pluggable member 15 in the receptacle.

Figure 10F:
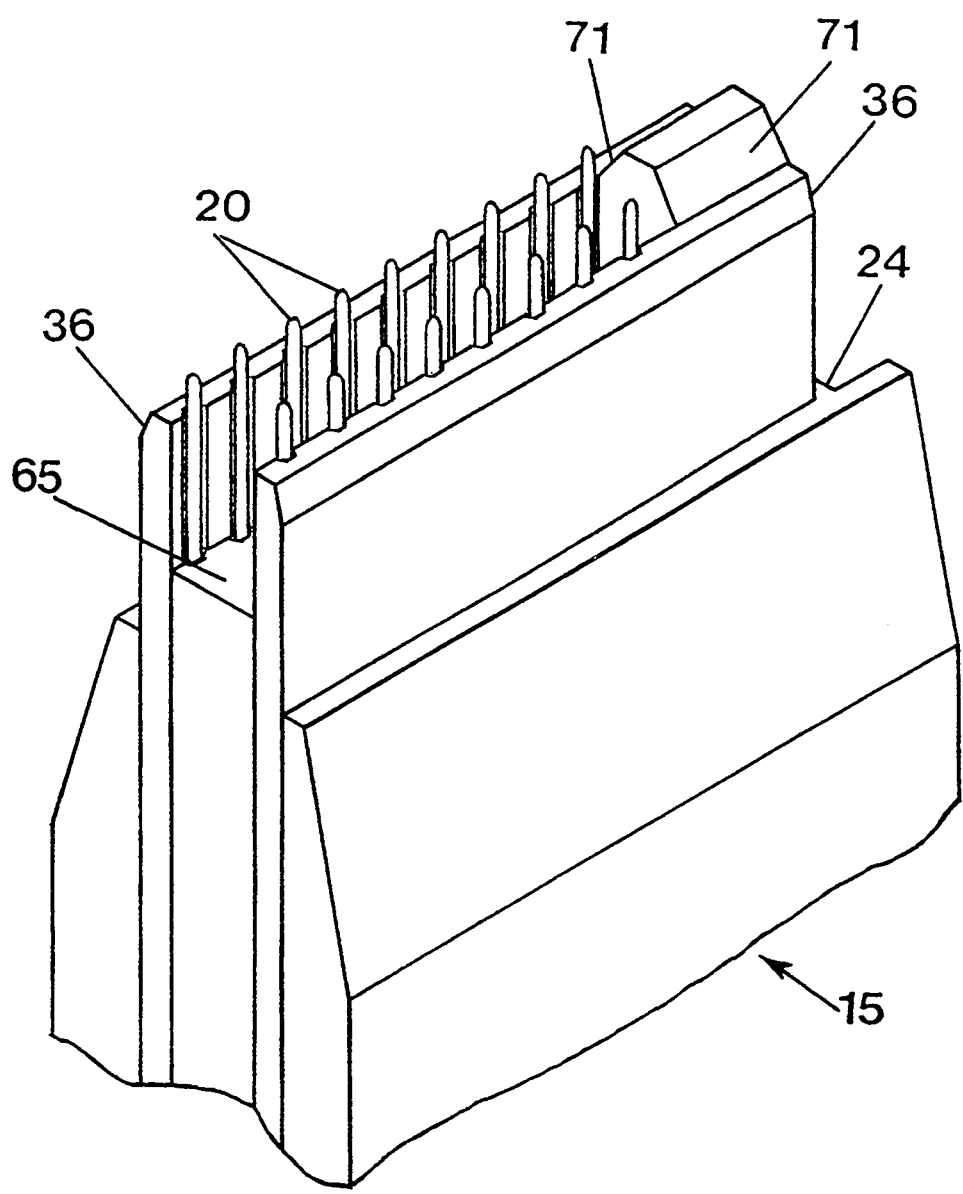
FIG. 10F illustrates a partial isometric view of the plug member configured for only having electrical contacts.

FIG. 10F shows a partial isometric view of a pluggable member 15 with only coaxial electrical contacts disposed along the edges of silicon member 65. This disconnectable coaxial contact interface is compatible with receptacles of FIGS. 3, 10A, and, 13.

Figure 11:
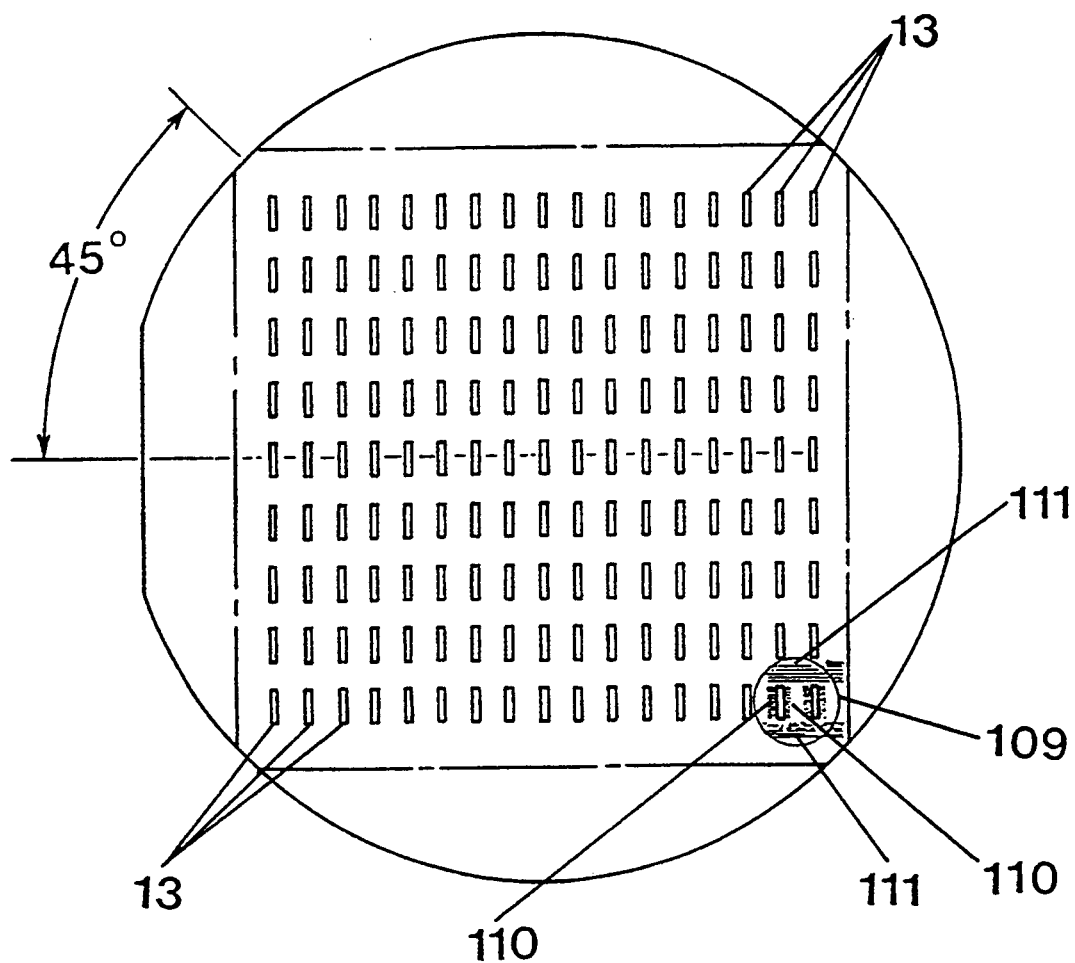
FIG. 11 illustrates an array of silicon receptacles integrated into a silicon chip-carrier.

FIG. 11 shows an array of silicon contact actuation wells as they would be processed on a 200 mm wafer. This wafer or any diced portion represents a silicon chip carrier with the contact actuation wells integrated into the chip carrier body. Inset 109 illustrates typical details of the entire wafer. Short V-grooves 110 between contact actuation aperture 13 may be used for wire contactors or grin lens segments. V-grooves 111 are for triangular shaped Ni plated Molybdenum power distribution wires.

Figure 12:
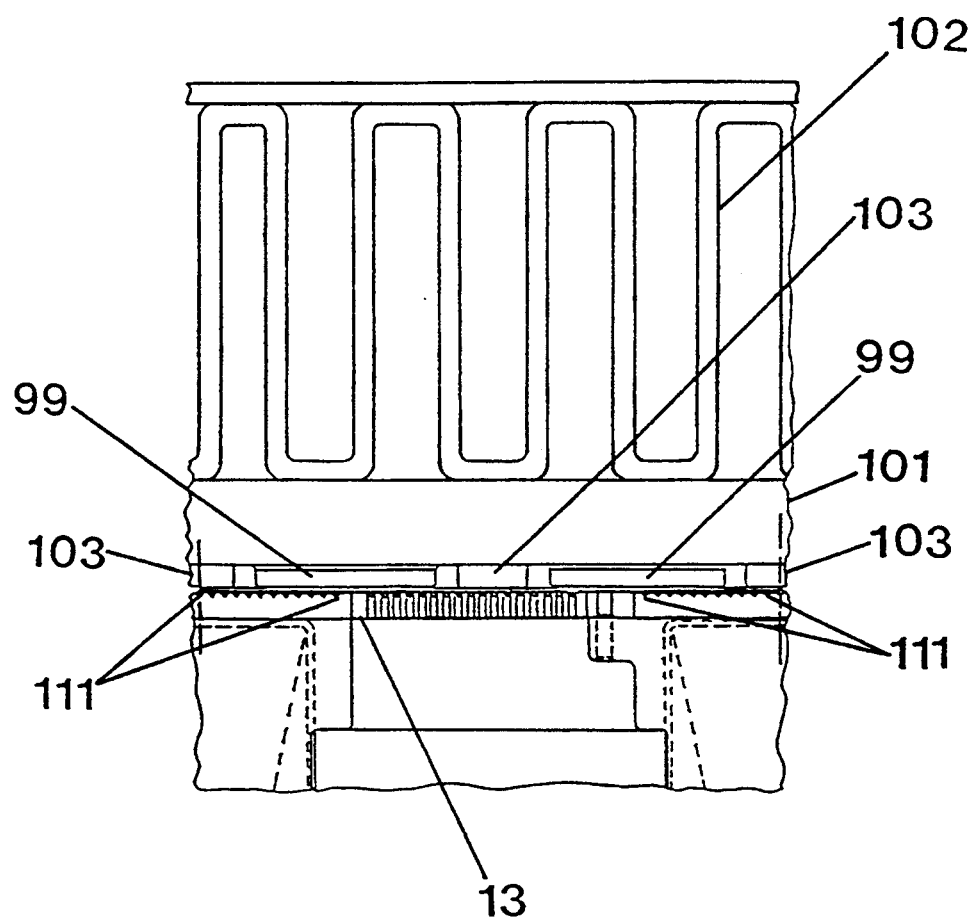
FIG. 12 is an enlarged partial cross-section of a hybrid plug assembly as it would be applied to an air cooled CMOS silicon chip carrier.

FIG. 12 shows a partial cross-section of the silicon chip carrier with connector removed. Power distribution v-grooves 111 are shown disposed between contact actuation apertures 13.

Figure 13:
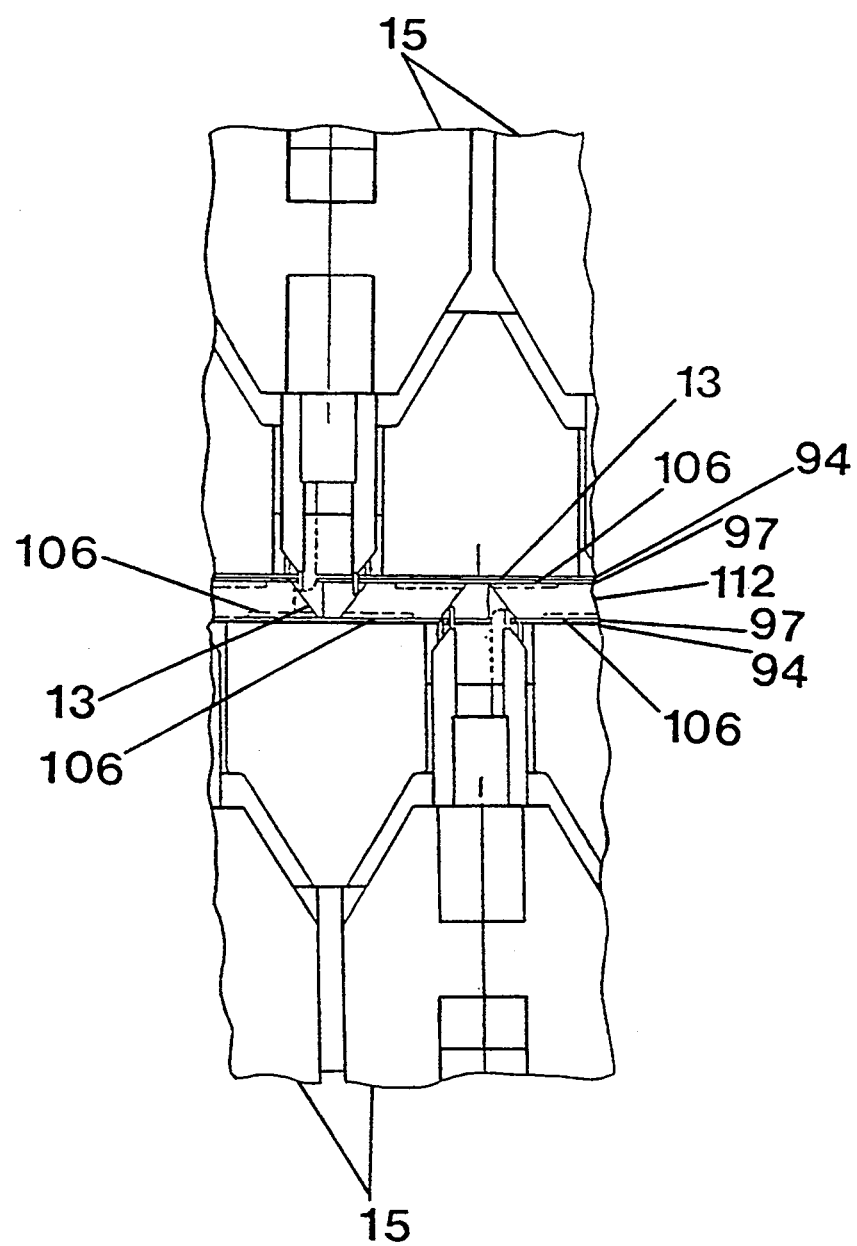
FIG. 13 illustrates a dual surface use of the plug connector on a silicon wafer with thin film wiring.

FIG. 13 illustrates a silicon carrier configured to support pluggable connectors 15 on both surfaces of a silicon contact actuation structure 112. The process would have to be altered to produce silicon actuation apertures from both surfaces of the silicon carrier. This arrangement would yield a 9×17 array on one surface and a 9×16 on the other for a total switch capability of 4,009 inputs and 4,009 outputs for the array shown in FIG. 11.

It should be understood that the above-described embodiments of this application are presented as examples and not as limitations. Modification may occur to those skilled in the art. Accordingly, the invention is not to be regarded as being limited by the embodiments disclosed herein, but as defined by the appended claims.

Having thus described our invention, what we claim as new and desire to secure by Letters Patent is:

1. A matrix of disconnectable connector receptacles, comprising:

a receptacle plate made of semiconductor material and formed with a multiplicity of receptacle slots, each receptacle slot having a contour for receiving and aligning an end of a plug assembly for enabling a transmission of signals between the plug assembly and the module, a substrate on which the receptacle plate forms a major surface, a housing surrounding the substrate and formed with multiple receptacle openings aligned with corresponding slots in the receptacle plate on the major surface of the substrate, a receptacle formed of each receptacle opening and a corresponding slot aligned together to receive and hold a plug assembly, and a cluster of cables being connected to a plug assembly, and the ends of cables in the plug assembly communicating signals between the cables and the module via the slot when the plug assembly is engaged with the slot.

2. A disconnectable receptacle matrix of connectors as defined in claim 1, further comprising:

receptacle contacts of conductive material deposited on opposite walls of at least some of the slots in the matrix, each receptacle contact being located opposite a non-conductive wall in a slot for engaging an electrical conductor of a plug assembly in a staggered alignment when a plug assembly is received in the slot.

3. A disconnectable receptacle matrix of connectors as defined in claim 1, further comprising:

a photonic receiver, transmitter or transceiver in the module aligned with a slot in the receptacle plate and an end of an optical fiber in a cluster of cables in the plug assembly for communicating optical signals between the module and the optical fiber.

4. A disconnectable receptacle matrix of connectors as defined in claim 1, further comprising:

a plurality of plug assemblies inserted into associated receptacles, some of the plug assemblies supporting only a cluster of coaxial cables, and other plug assemblies supporting only a cluster of optical fibers, electrical conductors of each plug assembly connected only to inner conductors of coaxial cables, the electrical conductors each engaging an electrical contact deposited on sloping walls of a receptacle slot receiving a plug assembly, and the electrical contacts of the slot connected to electrical lines of the module, and optical fibers of each plug assembly supporting only optical fibers communicating light signals with photonic receivers, transmitters and/or transceivers in the module in alignment with the slot.

5. A disconnectable receptacle matrix of connectors as defined in claim 1, further comprising:

all plug assemblies receivable by the matrix of receptacles supporting only clusters of coaxial cables, at least one of the plug assemblies inserted into a corresponding receptacle in the matrix, and electrical conductors of the plug assemblies being independently connected to different inner conductors of coaxial cables in the plug assemblies, and the electrical conductors independently engaging conductive materials deposited on sloping walls of slots in the receptacles which are connectable to wiring of the module.

6. A disconnectable receptacle matrix of connectors as defined in claim 1, further comprising:

electrical contacts deposited equally on all slots in the receptacle plate and connectable to any corresponding contacts on a plug assembly engaging any slot.

7. A disconnectable receptacle matrix of connectors as defined in claim 1, further comprising:

semiconductor chips positioned on the module in an opening in the receptacle plate for connection to wiring in the module.

8. A disconnectable receptacle matrix of connectors as defined in claim 1, further comprising:

semiconductor chips containing a photonic transceiver positioned in the module for communicating optical signals through a slot in the receptacle plate between an optical fiber in the plug assembly and the module.

9. A disconnectable receptacle matrix of connectors as defined in claim 1, further comprising:

conductors of a plug assembly received in a respective receptacle and being pressed against contacts deposited on walls of slots of the receptacles to engage the plug assembly in the respective receptacle while the plug assembly is held in an engaging position by a detent in an associated housing receptacle opening.

10. A disconnectable receptacle matrix of connectors as defined in claim 1, further comprising:

fan-out wiring deposited on the receptacle plate for connecting contacts in one slot to contacts in one or more other slots in the receptacle plate to enable selective electrical connections between different cables in plug assemblies in the receptacle matrix.

11. A disconnectable receptacle matrix of a connector as defined in claim 1, further comprising:

a multilayer ceramic module (MCM) containing wiring on, in and through the module, the MCM being contained in a housing and abutting the receptacle plate, and electrical connections being made between wiring on the MCM and contacts on the receptacle plate.

12. A disconnectable receptacle matrix of a connector as defined in claim 11, further comprising:

printed circuit chips located on a surface of the receptacle plate, and electrical circuits in the printed circuit chips for switching signals between contacts deposited on different slots of the receptacle plate.

13. A disconnectable receptacle matrix of a connector as defined in claim 11, further comprising:

switching circuits in the printed circuit chips for switching a signal received from a cable in any plug assembly to another cable in the same or another plug assembly engaging a slot in the receptacle plate.

14. A disconnectable receptacle matrix of a connector as defined in claim 1, further comprising:

the receptacle plate being made of silicon, and the contacts being conductors deposited as printed circuits on walls of the slots, and signals for switching between cables in any engaged plug assembly by circuits in semiconductor chips connected to the receptacle plate.

15. A matrix of disconnectable connectors as defined in claim 1, further comprising:

two receptacle plates located on opposite sides of a module to provide two major surfaces of the module, and two sets of openings formed in the housing on opposite sides of the module to provide two matrices of receptacles on major sides of the module for engaging respective matrices of plug assemblies.

16. A disconnectable receptacle matrix of connectors as defined in claim 1, further comprising:

chip(s) providing a photonic receiver, transmitter or transceiver mounted in a plug assembly for converting optical signals between an optical fiber in a cable cluster supported in the plug assembly and an electrical contact supported by the plug assembly for engaging an electrical contact deposited on the wall of a receptacle slot.

17. A disconnectable receptacle matrix of connectors as defined in claim 1, further comprising:

a silicon wafer formed into the receptacle plate by an etching process with angled slots formed therein as receptical components, and receptical contacts being deposited on the angled slots for engaging cantilevered plug contacts forced against the receptical contacts when a plug is received in the receptical, and V-grooves formed on one or both sides of the silicon wafer in a grid formation, conductive material deposited in the V-grooves to form a power grid of conductors for feeding power around the module, and means for connecting at least one point of the power grid to an I/O of the module to receive power for distribution to chips in the module when the silicon wafer is integrated into the substrate of the module.

18. A disconnectable receptacle matrix of connectors as defined in claim 1, further comprising:

a plurality of power grids being etched in V-grooves in different locations on the silicon wafer, and means for connecting the different power grids to different I/Os of the module for providing different voltage power grids for use by circuits of the module.

* * * * *